US012028681B2

(12) United States Patent
Goorevich et al.

(10) Patent No.: US 12,028,681 B2
(45) **Date of Patent: *Jul. 2, 2024**

(54) POWER MANAGEMENT FEATURES

(71) Applicant: Cochlear Limited, Macquarie University (AU)

(72) Inventors: Michael Goorevich, Narremburn (AU); Kenneth Oplinger, St. Leonards (AU); Zachary Mark Smith, Pymble (AU)

(73) Assignee: Cochlear Limited

( * ) Notice: Subject to any disclaimer, the term of this patent is extended or adjusted under 35 U.S.C. 154(b) by 0 days.

This patent is subject to a terminal disclaimer.

(21) Appl. No.: 17/986,569

(22) Filed: Nov. 14, 2022

(65) Prior Publication Data

US 2023/0145143 A1 May 11, 2023

Related U.S. Application Data

(63) Continuation of application No. 16/708,910, filed on Dec. 10, 2019, now Pat. No. 11,528,565, which is a (Continued)

(51) Int. Cl.
*H04R 25/00* (2006.01)

(52) U.S. Cl.
CPC ........... *H04R 25/30* (2013.01); *H04R 25/554* (2013.01); *H04R 25/558* (2013.01);

(Continued)

(58) Field of Classification Search
CPC ............ H04R 2460/03; H04R 2225/67; H04R 2225/31; H04R 25/606; H04R 25/554; H04R 25/558

(Continued)

(56) References Cited

U.S. PATENT DOCUMENTS 4,297,685 A 10/1981 Brainard, II
4,711,128 A 12/1987 Boura (Continued)

FOREIGN PATENT DOCUMENTS

KR 10-2015-0083715 A 7/2015
WO WO9701314 A1 1/1997

(Continued)

OTHER PUBLICATIONS

PCT Written Opinion of the International Searching Authority, International Application No. PCT/IB2016/057746, dated Apr. 14, 2017, pp. 1-8.

(Continued)

*Primary Examiner* — Disler Paul
(74) *Attorney, Agent, or Firm* — Edell, Shapiro & Finnan, LLC

(57) ABSTRACT

A method performed by an electronic controller includes determining a charge level of a power supply configured to provide power to a medical device, and estimating, based on the charge level of the power supply, a first power supply life for operating the medical device according to a first mode. Further, the method includes estimating, based on the charge level of the power supply, a second power supply life for operating the medical device according to a second mode. As recited, operating the medical device according to the first mode has a different power use or consumption characteristic from operating the medical device according to the second mode. The method also includes generating a notification indicative of the first power supply life and the second power supply life.

20 Claims, 5 Drawing Sheets

Related U.S. Application Data continuation of application No. 15/872,267, filed on Jan. 16, 2018, now Pat. No. 10,555,093, which is a continuation of application No. 15/165,406, filed on May 26, 2016, now Pat. No. 9,913,050.

(60) Provisional application No. 62/269,521, filed on Dec. 18, 2015.

(52) U.S. Cl.
CPC ........ *H04R 25/606* (2013.01); *H04R 2225/31* (2013.01); *H04R 2225/67* (2013.01); *H04R 2460/03* (2013.01); *H04R 2460/13* (2013.01)

(58) Field of Classification Search
USPC ........................................................ 381/60
See application file for complete search history.

(56) References Cited

U.S. PATENT DOCUMENTS

| | | | | |
|---|---|---|---|---|
| 6,330,339 | B1 | 12/2001 | Ishige et al. | |
| 6,711,271 | B2 * | 3/2004 | Hou | H04R 25/50 455/574 |
| 7,508,168 | B2 | 3/2009 | Nunomaki et al. | |
| 7,571,006 | B2 | 8/2009 | Gordon et al. | |
| 7,602,930 | B2 | 10/2009 | Kasztelan | |
| 8,050,439 | B2 | 11/2011 | Inoshita et al. | |
| 8,571,673 | B2 | 10/2013 | Stoffaneller | |
| 8,814,754 | B2 * | 8/2014 | Weast | A61B 5/1118 482/901 |
| 9,421,371 | B2 * | 8/2016 | Pless | A61F 7/007 |
| 9,572,533 | B2 | 2/2017 | Venkatraman et al. | |
| 9,753,528 | B2 * | 9/2017 | Tu | G06F 1/32 |
| 9,883,301 | B2 | 1/2018 | Gan et al. | |
| 9,942,576 | B2 | 4/2018 | Belk et al. | |
| 10,117,178 | B2 * | 10/2018 | Hijazi | H04W 4/80 |
| 10,206,589 | B2 * | 2/2019 | Walker | A61B 5/681 |
| 10,540,013 | B2 | 1/2020 | Ryu et al. | |
| 11,229,790 | B2 * | 1/2022 | Errico | A61B 5/4094 |
| 11,237,719 | B2 | 2/2022 | Sadi et al. | |
| 2002/0048382 | A1 | 4/2002 | Hou | |
| 2004/0070511 | A1 | 4/2004 | Kim | |
| 2005/0259838 | A1 | 11/2005 | Barthel | |
| 2007/0203536 | A1 | 8/2007 | Hochmair et al. | |
| 2010/0087700 | A1 | 4/2010 | Zimmerling | |
| 2011/0033073 | A1 | 2/2011 | Inoshita et al. | |
| 2011/0093039 | A1 | 4/2011 | Van Den Heuvel | |
| 2011/0288445 | A1 | 11/2011 | Lillydahl et al. | |
| 2012/0005490 | A1 | 1/2012 | Goraczko et al. | |
| 2012/0130660 | A1 | 5/2012 | Neumeyer | |
| 2012/0317432 | A1 | 12/2012 | Assad et al. | |
| 2013/0109909 | A1 | 5/2013 | Van Gerwen | |
| 2013/0272556 | A1 | 10/2013 | Hamacher | |
| 2014/0052217 | A1 | 2/2014 | Smith | |
| 2014/0270296 | A1 | 9/2014 | Fort et al. | |
| 2014/0307901 | A1 | 10/2014 | Ku et al. | |
| 2014/0321682 | A1 | 10/2014 | Kofod-Hansen et al. | |
| 2015/0036853 | A1 | 2/2015 | Solum et al. | |
| 2015/0230032 | A1 | 8/2015 | Petersen et al. | |
| 2015/0230036 | A1 | 8/2015 | Pedersen et al. | |
| 2015/0326985 | A1 | 11/2015 | Priyantha et al. | |
| 2015/0351037 | A1 | 12/2015 | Brown et al. | |
| 2016/0015268 | A1 * | 1/2016 | Bernstein | G01N 33/48792 600/347 |
| 2016/0066113 | A1 | 3/2016 | Elkhatib et al. | |
| 2016/0161985 | A1 | 6/2016 | Zhang | |
| 2016/0199644 | A1 | 7/2016 | Van den Heuvel | |
| 2016/0292989 | A1 | 10/2016 | Belk et al. | |
| 2017/0013369 | A1 | 1/2017 | Renken et al. | |
| 2017/0061950 | A1 | 3/2017 | Benway et al. | |
| 2017/0084155 | A1 | 3/2017 | Mese et al. | |

FOREIGN PATENT DOCUMENTS

| | | | |
|---|---|---|---|
| WO | 2013107507 | A1 | 7/2013 |
| WO | 2015138828 | A1 | 9/2015 |

OTHER PUBLICATIONS

PCT International Search Report; International Application No. PCT/IB2016/057746, dated Apr. 14, 2017, pp. 1-3.

Extended European Search Report in corresponding European Application No. 16875039.6, dated Apr. 10, 2019, 9 pages.

Communication in counterpart European Application No. 16 875 039.6-1207, dated Jan. 7, 2022, 5 pages.

* cited by examiner

POWER MANAGEMENT FEATURES

CROSS-REFERENCE TO RELATED APPLICATION

This application is a continuation application of U.S. patent application Ser. No. 16/708,910, filed Dec. 10, 2019, which is a continuation application of U.S. patent application Ser. No. 15/872,267, filed on Jan. 16, 2018, now U.S. Pat. No. 10,555,093, which is a continuation of U.S. patent application Ser. No. 15/165,406, filed on May 26, 2016, now U.S. Pat. No. 9,913,050, which in turn claims priority to U.S. Provisional Patent Application No. 62/269,521, entitled "Power Management Features," filed on Dec. 18, 2015. The above applications are hereby incorporated by reference herein in their entireties.

BACKGROUND

Various types of hearing prostheses provide persons with different types of hearing loss with the ability to perceive sound. Generally, hearing loss may be conductive, sensorineural, or some combination of both conductive and sensorineural. Conductive hearing loss typically results from a dysfunction in any of the mechanisms that ordinarily conduct sound waves through the outer ear, the eardrum, or the bones of the middle ear. Sensorineural hearing loss typically results from a dysfunction in the inner ear, including the cochlea where sound vibrations are converted into neural signals, or any other part of the ear, auditory nerve, or brain that may process the neural signals.

Example hearing prostheses include traditional hearing aids, vibration-based hearing devices, cochlear implants, and auditory brainstem implants. A traditional hearing aid, which is an acoustic stimulation device, typically includes a small microphone to detect sound, an amplifier to amplify certain portions of the detected sound, and a speaker to transmit the amplified sounds into the person's ear canal.

A vibration-based hearing device, which is also an acoustic stimulation device, typically includes a microphone to detect sound and a vibration mechanism to apply mechanical vibrations corresponding to the detected sound directly to a person, thereby causing vibrations in the person's inner ear. Vibration-based hearing devices include, for example, bone conduction devices, middle ear devices, and direct acoustic cochlear stimulation devices. A bone conduction device transmits vibrations corresponding to sound via the teeth and/or skull. A so-called middle ear device transmits vibrations corresponding to sound via the middle ear (i.e., the ossicular chain), without using the teeth or skull. A direct acoustic cochlear stimulation device transmits vibrations corresponding to sound via the inner ear (i.e., the cochlea), without using the teeth, skull or middle ear.

A cochlear implant provides a person with the ability to perceive sound by stimulating the person's auditory nerve via an array of electrodes implanted in the person's cochlea. A microphone coupled to the cochlear implant detects sound waves, which are converted into a series of electrical stimulation signals that are delivered to the implant recipient's cochlea via the array of electrodes. An auditory brainstem implant may use technology similar to a cochlear implant, but instead of applying electrical stimulation to a person's cochlea, the auditory brainstem implant applies electrical stimulation directly to a person's brain stem, bypassing the cochlea altogether. Electrically stimulating auditory nerves in a cochlea with a cochlear implant or electrically stimulating a brainstem may enable persons with hearing loss to perceive sound.

Further, some persons may benefit from a hearing prosthesis that combines two or more characteristics of a traditional hearing aid, vibration-based hearing device, cochlear implant, or auditory brainstem implant (e.g., two or more modes of stimulation) to enable the person to perceive sound. Such hearing prostheses can be referred to as bimodal hearing prostheses. Still other persons benefit from two hearing prostheses, one for each ear (e.g., a so-called binaural system generally or a bilateral system for persons with two cochlear implants).

SUMMARY

Some hearing prostheses include separate units or elements that function together to enable the person or recipient to perceive sound. In one example, a hearing prosthesis includes a first unit that is external to the person and a second unit that may be implanted in the person. These external and internal units may be operated in different modes, as needed or desired by the recipient. For example, in one operating mode, the external unit is configured to detect sound using one or more microphones, to encode the detected sound as acoustic signals, and to deliver the acoustic signals to the internal unit over a coupling or link between the external and internal units. The internal unit is configured to apply the delivered acoustic signals as output signals to the person's hearing. The output signals applied to the person's hearing system can include, for example, audible signals, vibrations, and electrical signals, as described generally above.

In another operating mode, which may be performed concurrently or separately with the above-described operating mode, the external unit is configured to deliver power to the internal unit over the link. The internal unit is configured to apply the received power to operate components of the internal unit and/or to charge a battery of the internal unit, which in turn provides power to operate components of the internal unit.

In a further operating mode, the internal unit is configured to function as a totally implantable hearing prosthesis that performs both sound processing and stimulation functions without requiring the external unit to function. More particularly, the internal unit is configured to detect sound using one or more internal microphones, to encode the detected sound as acoustic signals, and to apply the acoustic signals as output signals to the person's hearing system. The internal unit in this further operating mode may, as needed or desired, still be coupled to the external unit, for instance, to recharge a battery of the internal unit. One benefit of this further operating mode or totally implantable hearing prosthesis mode is the ability to maintain some level of hearing while the recipient is asleep, during which time the external unit may not be communicatively coupled to the internal unit.

As discussed in more detail hereinafter, the present disclosure relates to systems and methods for monitoring a remaining power supply life when operating a device according to one or more modes, and providing a notification to a user of the remaining power supply life. Such monitoring and notifications help to inform a user of the need to recharge a battery of the internal unit in advance of an extended period during which the internal unit will be operating on only battery power, e.g., while the user is asleep and the internal unit is decoupled from the external unit (or some other battery charging unit). The present disclosure also relates to power management features that help to ensure that the internal unit is provided with power to operate continuously throughout typical daily sleep and awake cycles of the recipient. As one result, the power management features disclosed herein help to encourage the recipient to rely on the operation of the hearing prosthesis while the recipient is asleep, and consequently to provide a reliable 24-hour hearing solution.

The present disclosure also relates to monitoring operating conditions of the hearing prosthesis, which can help to improve the usefulness or effectiveness of notifications provided to the user. Such operating conditions include, for instance, an orientation or changes in orientation of the hearing prosthesis, interactions between the hearing prosthesis and other remote devices, determining that the recipient's voice is present in sound detected by the hearing prosthesis, and a current mode and historical information regarding operation in one or more modes.

In addition, the present disclosure relates to monitoring operating conditions of the hearing prosthesis and to, in response to the operating conditions, responsively transition or switch between different operating modes. In one example, the hearing prosthesis is configured to monitor operating conditions and to responsively transition between an awake mode and a sleeping mode. Generally, when one or more particular operating conditions are met, the hearing prosthesis may automatically transition between modes without requiring input from a user. In other examples, the hearing prosthesis may notify the recipient of the transition between operating modes and/or may require confirmation from the user before transitioning between operating modes.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

DETAILED DESCRIPTION

The following detailed description describes various features, functions, and attributes with reference to the accompanying figures. In the figures, similar symbols typically identify similar components, unless context dictates otherwise. The illustrative embodiments described herein are not meant to be limiting. Certain features, functions, and attributes disclosed herein can be arranged and combined in a variety of different configurations, all of which are contemplated in the present disclosure. For illustration purposes, some features and functions are described with respect to medical devices, such as hearing prostheses. However, the features and functions disclosed herein may also be applicable to other types of devices, including other types of medical and non-medical devices.

Figure 1:
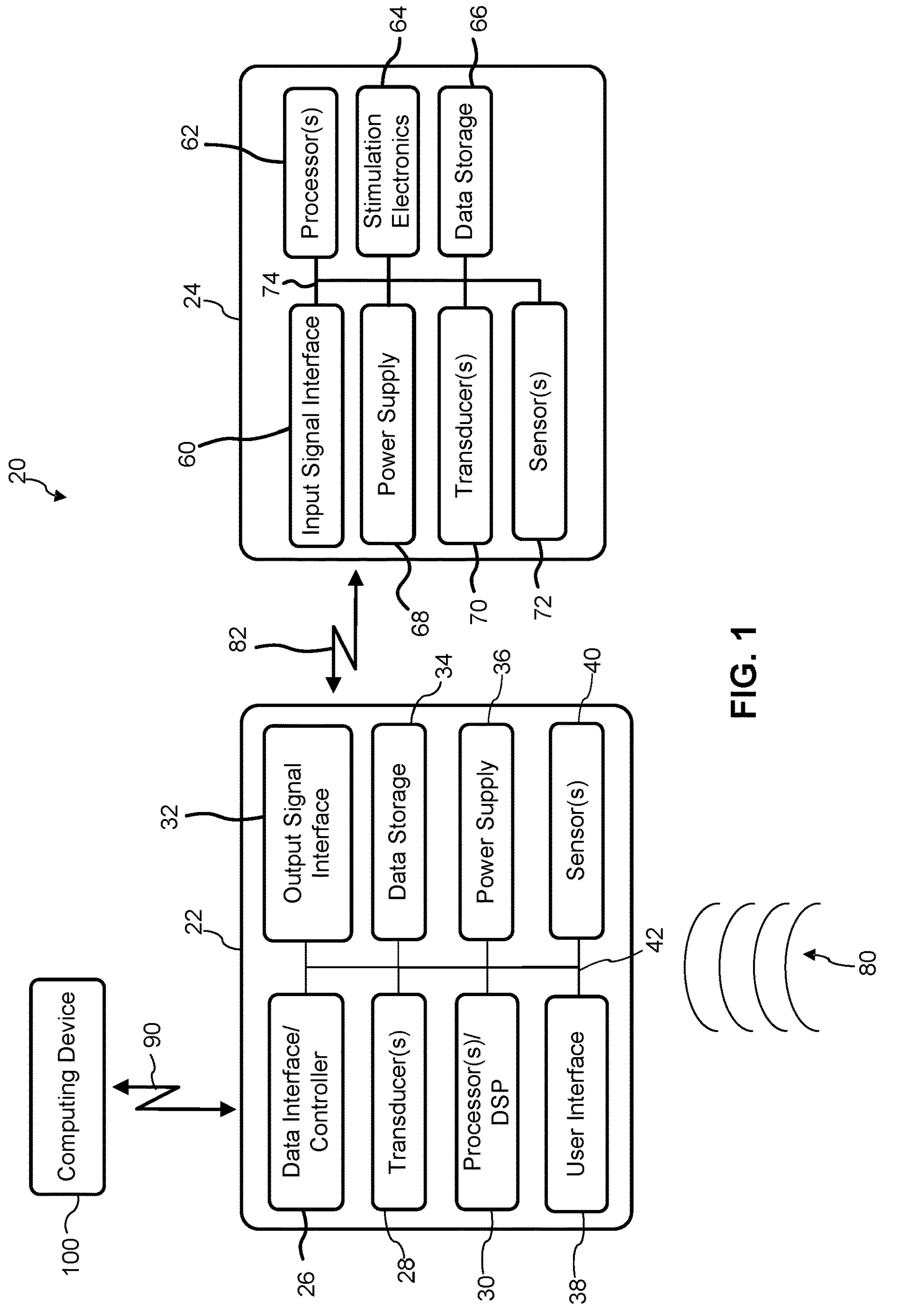
FIG. 1 illustrates a block diagram of a hearing prosthesis system according to an embodiment of the present disclosure.

Referring now to FIG. 1, an example electronic system 20 includes a first unit 22 and a second unit 24. The system 20 may include a hearing prosthesis, such as a cochlear implant, a bone conduction device, a direct acoustic cochlear stimulation device, an auditory brainstem implant, a bimodal hearing prosthesis, a middle ear stimulating device, or any other type of hearing prosthesis configured to assist a prosthesis recipient to perceive sound.

In this context, the first unit 22 is configured to be generally external to a recipient and communicate with the second unit 24, which is configured to be implanted in the recipient. Generally, an implantable element or device can be hermetically sealed and otherwise adapted to be at least partially implanted in a person.

In FIG. 1, the first unit 22 includes a data interface 26 (such as a universal serial bus (USB) controller), one or more transducers 28, one or more processors 30 (such as digital signal processors (DSPs)), an output signal interface or communication electronics 32 (such as an electromagnetic radio frequency (RF) transceiver), data storage 34, a power supply 36, a user interface module 38, and one or more sensors 40, all of which are coupled directly or indirectly via a wired conductor or wireless link 42. In the example of FIG. 1, the second unit 24 includes an input signal interface or communication electronics 60 (such as an RF receiver), one or more processors 62, stimulation electronics 64, data storage 66, a power supply 68, one or more transducers 70, and one or more sensors 72, all of which are illustrated as being coupled directly or indirectly via a wired or wireless link 74.

Generally, the transducer(s) 28, 70 of the first and second units 22, 24, respectively, are configured to receive external acoustic signals or audible sounds 80. Although, in practice, the transducers 28, 70 may not be configured to receive sounds 60 for further processing simultaneously. The transducer 28, 70 may include combinations of one or more omnidirectional or directional microphones configured to receive background sounds and/or to focus on sounds from a specific direction, such as generally in front of the prosthesis recipient. Alternatively or in addition, the transducers 28, 70 may include telecoils or other sound transducing components that receive sound and convert the received sound into electronic signals. Further, the system 20 may be configured to receive sound information from other sound input sources, such as electronic sound information received through the data interface 26 and/or through the input signal interface 60.

In one example, the processor 30 of the first unit 22 is configured to process, amplify, encode, or otherwise convert the audible sounds 80 (or other electronic sound information) into encoded electronic signals that include audio data representing sound information, and to apply the encoded electronic signals to the output signal interface 32. In another example, the processor 62 of the second unit 24 is also configured to process, amplify, encode, or otherwise convert the audible sounds 80 (or other electronic sound information) into encoded electronic signals that include audio data representing the sound information, and to apply the encoded electronic signals to the stimulation electronics 64. Generally, the processors 30, 62 are configured to convert the audible sounds or other electronic sound information into the encoded electronic signals in accordance with configuration settings or data for a prosthesis recipient. The configuration settings allow a hearing prosthesis to be configured for or fitted to a particular recipient. These configuration settings can be stored in the data storage 34, 66, for example.

The output signal interface 32 of the first unit 22 is configured to transmit encoded electronic signals as electronic output signals 82 to the input signal interface 60 of the second unit 24. As discussed above, the encoded electronic signals may include audio data representing sound information. The encoded electronic signals may also include power signals either with the audio data or without the audio data. Illustratively, the interfaces 32, 60 include magnetically coupled coils that establish an RF link between the units 22, 24. Accordingly, the output signal interface 32 can transmit the output signals 82 encoded in a varying or alternating magnetic field over the RF link between the units 22, 24.

Further, the processors 30, 60 are configured to transmit signals between the first and second units in accordance with a communication protocol, the details of which may be stored in the data storage 34, 66, for example. The communication protocol defines how the stimulation data is transmitted from the first unit 22 to the second unit 24. Illustratively, the communication protocol may be an RF protocol that is applied after the stimulation data is generated to define how the stimulation data will be encoded in a structured signal frame format of the output signals 82. In addition to the stimulation data, the communication protocol defines how power signals are supplied over the structured signal frame format to provide a power flow to the second unit 24.

Illustratively, the structured signal format includes output signal data frames for stimulation data and additional output signal power frames. In one example, the output signal power frames include pseudo-data to fill in partially a dead time associated with the signal, which facilitates a more continuous power flow to the second device when the encoded electronic signals include data and power. However, in other examples, additional output signal power frames are not necessary to transmit sufficient power along with stimulation data to the second device, because there may be enough "one" data cells of the stimulation data to provide power and/or a carrier wave of the output signals 62 may provide sufficient power. When the first unit 22 transmits only power to the second unit 24, the structured signal format may include only output signal power frames that are configured to provide a suitable amount of power to the second unit 24 (e.g., for charging the power supply 68 and/or for providing operating power to the various components of the second element).

Once the processor 30 encodes the stimulation data and/or power signals using the communication protocol, the processor 30 may then provide the encoded stimulation data and/or power signals to the output signal interface 32, which in one example includes an RF modulator. The RF modulator is configured to modulate the encoded stimulation data and/or power signals with a carrier signal, e.g., a 5 MHz carrier signal, and the modulated 5 MHz carrier signal is transmitted over the RF link from the output signal interface 32 to the input signal interface 60. In various examples, the modulations can include OOK or frequency-shift keying (FSK) modulations based on RF frequencies between about 100 kHz and 50 MHz.

The second unit 24 receives the output signals 82 via the input signal interface 60. In one example, the input signal interface 60 is an RF receiver system or circuit that includes a receiving coil and associated circuitry for receiving RF signals. The processor 62 is configured to decode the received output signals 82 and extract the encoded electronic signals. As discussed above, the processor 60 is also configured generate encoded electronic signals directly from the sounds 80 received by the transducer 70. The second unit 24 is configured to apply the encoded electronic signals to the stimulation electronics 64. The stimulation electronics 64 use the encoded electronic signals to generate an output that allows a recipient to perceive the encoded electronic signals as sound. In the present example, the stimulation electronics 64 include a transducer or actuator that provides auditory stimulation to the recipient through one or more of electrical nerve stimulation, audible sound production, or mechanical vibration of the cochlea, for instance.

The first and second units 22, 24 are also configured for backlink communications exchanged between the signal interfaces 32, 60. Such backlink communications can be used to control the electrical signals provided to the second unit 24, and to communicate other data between the first and second units 22, 24.

Referring back to the power supplies 36, 68, each power supply provides power to various components of the first and second units 22, 24, respectively. In another variation of the system 20 of FIG. 1, one of the power supplies may be omitted, for example, the system may include only the power supply 36 or the power supply 68, which is used to provide power to other components. The power supplies 36, 68 can be any suitable power supply, such as one or more non-rechargeable or rechargeable batteries. In one example, one or more of the power supplies 36, 68 are batteries that can be recharged wirelessly, such as through inductive charging. Generally, a wirelessly rechargeable battery facilitates complete subcutaneous implantation of a device to provide a fully or at least partially implantable prosthesis. A fully implanted hearing prosthesis has the added benefit of enabling the recipient to engage in activities that expose the recipient to water or high atmospheric moisture, such as swimming, showering, saunaing, etc., without the need to remove, disable or protect, such as with a water/moisture proof covering or shield, the hearing prosthesis. A fully implanted hearing prosthesis also spares the recipient of stigma, imagined or otherwise, associated with use of the prosthesis.

Further, the data storage 34, 66 may be any suitable volatile and/or non-volatile storage components. The data storage 34, 66 may store computer-readable program instructions and perhaps additional data. In some embodiments, the data storage 34, 66 stores data and instructions used to perform at least part of the processes disclosed herein and/or at least part of the functionality of the systems described herein. Although the data storage 34, 66 in FIG. 1 are illustrated as separate blocks, in some embodiments, the data storage can be incorporated, for example, into the processor(s) 30, 62, respectively.

The user-interface module 38 may include one or more user-input components configured to receive an input from the recipient, or perhaps another user, to control one or more functions of the system 20. The one or more user-input components may include one or more switches, buttons, capacitive-touch devices, and/or touchscreens, for instance. The user-interface module 38 may also include one or more output components, such as one or more light emitting diode (LED) arrays or displays, liquid crystal displays, and/or touchscreens. The display output may provide a visual indication or notification of a power supply life of the system. More particularly, the display output may provide visual indication of a power supply life of the second unit associated with one or more operating modes. Other example displays are also possible.

The system 20 can also include one or more sensors 40, 72 that are included in one or more of the first unit 22 or the second unit 24. In embodiments disclosed herein, these sensors are used to detect or monitor a state of the system 20. For instance, the sensors are configured to generate data, and one or both of the processors 30, 62 are configured to use the generated data to determine whether a user or recipient of the system 20 is asleep or awake. In one example, the sensors 40, 72 include a temperature sensor that measures body temperature of the recipient. In this example embodiment, the processors are configured to detect a drop in body temperature, which corresponds to a determination that the recipient is asleep.

In another example, the sensors 40, 72 include an orientation sensor (e.g., a MEMS accelerometer and/or gyroscope) that is used to determine an orientation or changes in orientation of one or more of the first or second units 22, 24, which corresponds to an orientation of the recipient's body. For instance, if an orientation sensor generates data that is indicative of the recipient being horizontal for longer than a threshold period (e.g., thirty minutes), the processors may determine that the recipient is sleeping.

The system 20 illustrated in FIG. 1 further includes a computing device 100 that is configured to be communicatively coupled to the first unit 22 and/or the second unit 24 via a connection or link 90. The link 90 may be any suitable wired connection, such as an Ethernet cable, a Universal Serial Bus connection, a twisted pair wire, a coaxial cable, a fiber-optic link, or a similar physical connection, or any suitable wireless connection, such as BLUETOOTH, WI-FI, WiMAX, inductive or electromagnetic coupling or link, and the like.

In one example, the computing device 100 and the link 90 are configured to receive data from the first unit 22 and/or the second unit 24. In this example, the received data relates to a power supply life, and the computing device generates a display output that provides a visual indication or notification of a power supply life of the system. In one example, the display output provides a visual indication of a power supply life of the second unit associated with one or more operating modes.

In other examples, the computing device and link are also configured to adjust various parameters of the hearing prosthesis. For instance, the computing device and the link may be configured to load a recipient's configuration settings on the hearing prosthesis, such as via the data interface 26 and/or the input signal interface 60. In another example, the computing device and the link are configured to upload other program instructions and firmware upgrades to the hearing prosthesis. In yet other examples, the computing device and the link are configured to deliver data (e.g., sound information) and/or power to the hearing prosthesis to operate the components thereof and/or to charge a power supply. Still further, various other modes of operation of the prosthesis can be implemented by utilizing the computing device and the link.

Generally, the computing device 100 includes various components, such as a processor, a storage device, and a power source. In one example, the computing device also includes a user interface module or other input/output devices (e.g., buttons, dials, a touch screen with a graphic user interface, and the like) that can be used to generate a display, turn the prosthesis on and off, adjust the volume, or adjust or fine tune the configuration data or parameters. Thus, the computing device can be utilized by the recipient or a third party, such as a guardian of a minor recipient or a health care professional, to monitor and control operating conditions of the hearing prosthesis.

Figure 2:
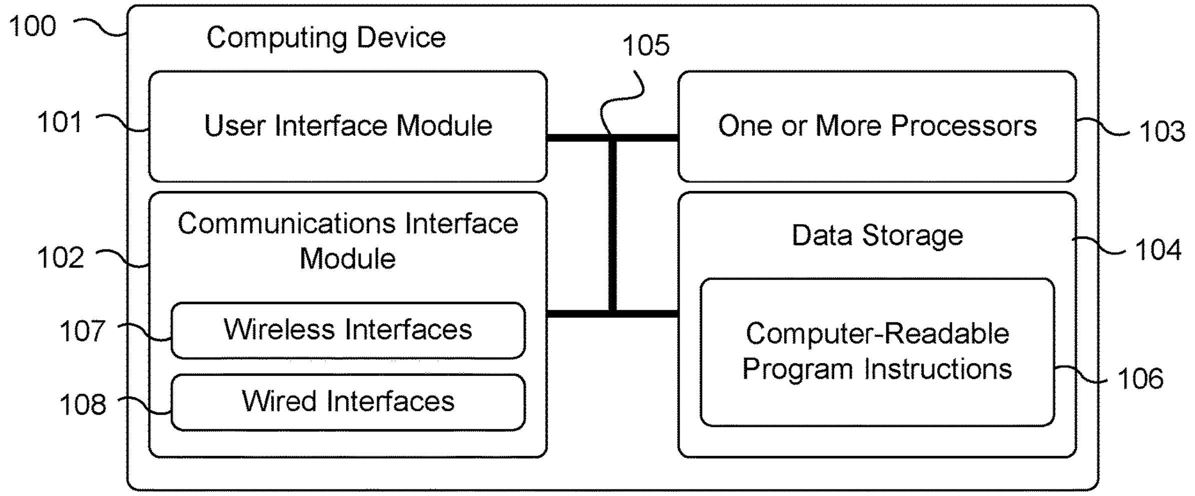
FIG. 2 illustrates a block diagram of a computing device according to an embodiment of the present disclosure.

FIG. 2 shows a block diagram of an example of the computing device 100.

Illustratively, the computing device 100 can be a smart phone, a remote control, or other device that is communicatively coupled to the system 20 of FIG. 1. As illustrated, the computing device 100 includes a user interface module 101 or other input/output devices (e.g., a display, buttons, dials, a touch screen with a graphic user interface, and the like), a communications interface module 102, one or more processors 103, and data storage 104, all of which may be linked together via a system bus or other connection mechanism 105.

The user interface module 101 is configured to send data to and/or receive data from external user input/output devices. For example, the user interface module 101 may be configured to send/receive data to/from user input devices such as a keyboard, a keypad, a touch screen, a computer mouse, a track ball, a joystick, and/or other similar devices, now known or later developed. The user interface module 101 may also be configured to provide output to or otherwise include a display device, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 101 may also be configured to generate audible output(s) or otherwise include an audio output device, such as a speaker, speaker jack, audio output port, audio output device, earphones, and/or other similar devices, now known or later developed.

The communications interface module 102 may include one or more wireless interfaces 107 and/or wired interfaces 108 that are configurable to communicate via a communications connection to the system 20, to another type of hearing prosthesis, or to other computing devices. The wireless interfaces 107 may include one or more wireless transceivers, such as a BLUETOOTH transceiver, a WI-FI transceiver, a WiMAX transceiver, and/or other similar type of wireless transceiver configurable to communicate via a wireless protocol. The wired interfaces 108 may include one or more wired transceivers, such as an Ethernet transceiver, a Universal Serial Bus (USB) transceiver, or similar transceiver configurable to communicate via a twisted pair wire, a coaxial cable, a fiber-optic link or a similar physical connection.

The one or more processors 103 may include one or more general purpose processors (e.g., microprocessors manufactured by Intel or Advanced Micro Devices) and/or one or more special purpose processors (e.g., digital signal processors, application specific integrated circuits, etc.). The one or more processors 103 may be configured to execute computer-readable program instructions 106 that are contained in the data storage 104 and/or other instructions based on algorithms described herein.

The data storage 104 may include one or more computer-readable storage media that can be read or accessed by at least one of the processors 103. The one or more computer-readable storage media may include volatile and/or non-volatile storage components, such as optical, magnetic, organic or other memory or disc storage, which can be integrated in whole or in part with at least one of the processors 103. In some embodiments, the data storage 104 may be implemented using a single physical device (e.g., one optical, magnetic, organic or other memory or disc storage unit), while in other embodiments, the data storage 104 may b e implemented using two or more physical devices.

The data storage 104 may include computer-readable program instructions 106 and perhaps additional data. In some embodiments, the data storage 104 may additionally include storage required to perform at least part of the herein-described methods and algorithms and/or at least part of the functionality of the systems described herein.

Various modifications can be made to the system 20 illustrated in FIG. 1 and the computing device 100 in FIG. 2. For example, a user interface or input/output devices can be incorporated into the first unit 22 and/or the second unit 24. Generally, the system 20 may include additional or fewer components arranged in any suitable manner. In some examples, the system 20 may include other components to process external audio signals, such as components that measure vibrations in the skull caused by audio signals and/or components that measure electrical outputs of portions of a person's hearing system in response to audio signals.

Figure 3:
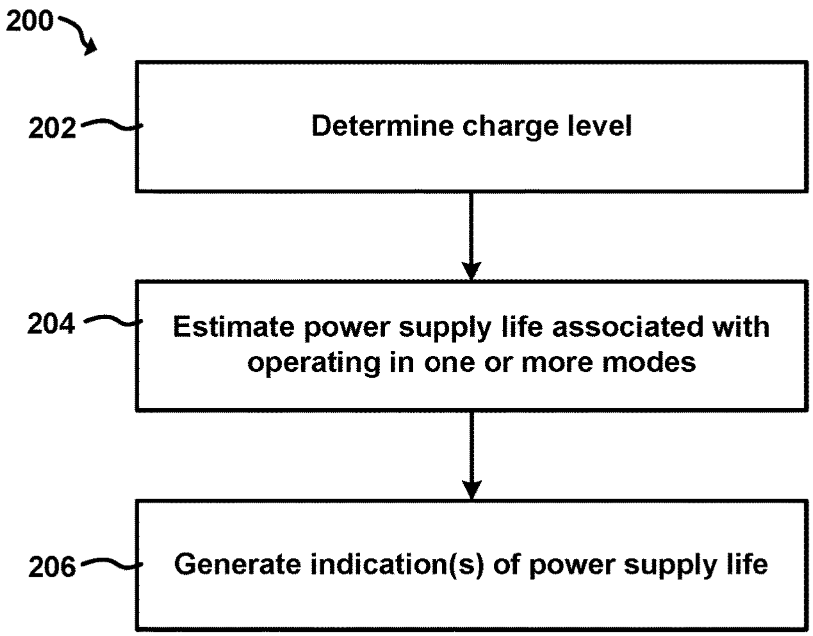
FIGS. 3-5 are example methods according to embodiments of the present disclosure.
Figure 4:
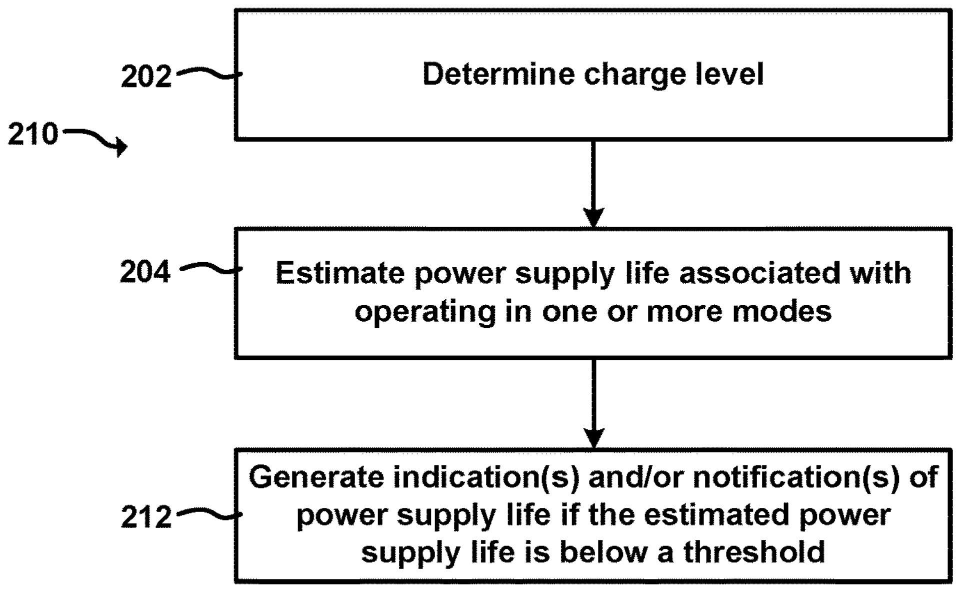
Figure 5:
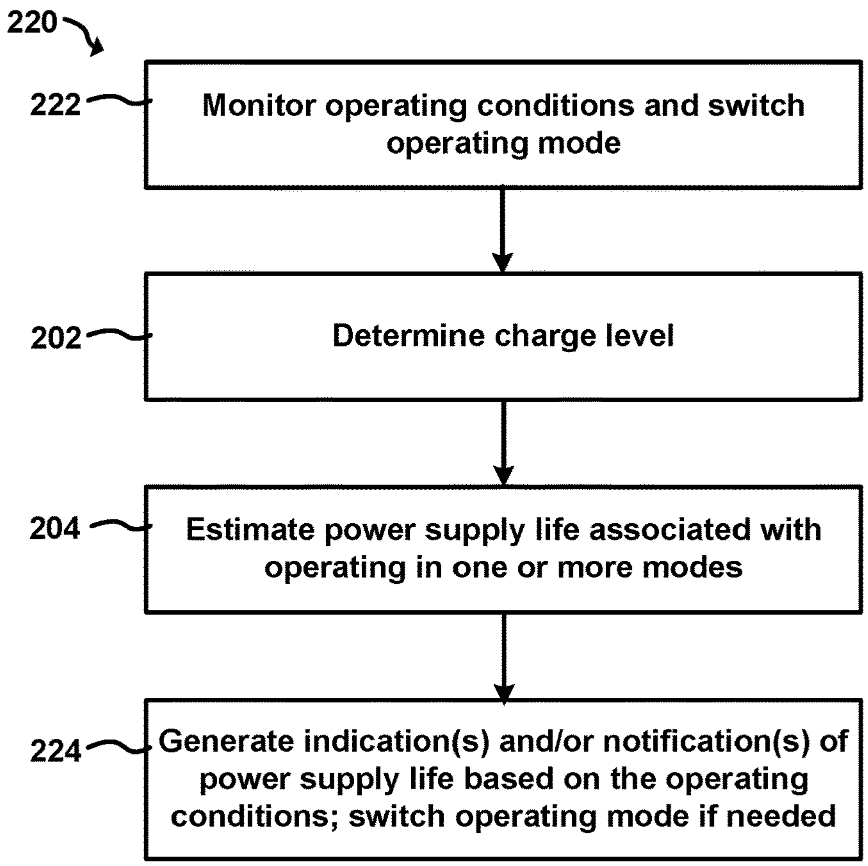

Referring now to FIGS. 3-5, example methods are illustrated, which can be implemented by the system 20 of FIG. 1 and the computing device 100 of FIG. 2, for instance. Generally, the illustrated methods may include one or more operations, functions, or actions as illustrated by one or more of blocks. Although the illustrated blocks are shown in a particular order, these blocks may also be performed in a different order than illustrated, and some blocks may even be omitted and other blocks may be added according to certain implementations.

In addition, one or more of the illustrated blocks may represent a module, a segment, or a portion of program code, which includes one or more instructions executable by a processor for implementing specific logical functions or steps in the process. The program code may be stored on any type of computer readable medium or storage device including a disk or hard drive, for example. The computer readable medium may include non-transitory computer readable medium, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), etc. The computer readable media may also include any other volatile or non-volatile storage systems. The computer readable medium may be considered a computer readable storage medium, for example, or a tangible storage device. In addition, one or more of the blocks may represent circuitry, e.g., an application specific integrated circuit, configured to perform the logical functions of the illustrated methods.

In FIG. 3, a method 200 includes a block 202, at which the processor 62 is configured to continuously or periodically monitor or determines a charge level of the power supply or battery 68. In one example, the processor determines a voltage of the power supply, and correlates the voltage to a remaining charge level of the battery. In another example, the processor measures a current of the power supply and uses an integration technique (e.g., coulomb counting) to estimate the charge level of the power supply.

At block 204, the processor 62 uses the determined charge level to estimate a remaining power supply life associated with operating the second unit 24 according to one or more operating modes. Example operating modes include a first mode that is used while the recipient is awake, and a different second mode that is used while the recipient is asleep. The second unit may operate in the awake mode, the sleeping mode, or another another mode based on a user selection received at a user interface module, for instance. Generally, these awake and sleeping modes are associated with different power consumption characteristics based on various operational variables that are programed for a particular recipient. Example operational variables in the context of a hearing prosthesis include threshold hearing levels, stimulation levels, dynamic ranges, FM or powered antenna range, and other signal processing strategies.

In an operating mode used while the recipient is asleep, for example, the threshold hearing level may be higher than in an operating mode used while the recipient is awake. This higher threshold hearing level is determined so that loud noises (e.g., an alarm clock, a baby crying, a smoke detector alarm, and the like) trigger the processor to generate stimulation signals that are applied to the recipient, while softer noises do not result in the generation of stimulation signals.

The stimulation levels relate generally to gain or amplification that is used to generate stimulation signals that are applied to the recipient. Higher gain or amplification results in the recipient perceiving an applied stimulation signal as a louder sound. In one example, the stimulation level is greater in the operating mode used while the recipient is awake than in the operating mode used while the recipient is asleep.

The dynamic range relates generally to the range of frequencies that trigger the processor to generate stimulation signals. In one example, the dynamic range is larger in the operating mode used while the recipient is awake than in the operating mode used while the recipient is asleep.

In a hearing prosthesis that includes an FM system configured with a powered antenna, the range of the FM system can be increased or decreased (or turned off) based on an operating mode, which in turn affects power consumption. For instance, the FM system range can be increased in the operating mode used while the recipient is awake, and decreased or turned off in the operating mode used while the recipient is asleep.

Examples of other signal processing strategies include the use of a tinnitus suppression algorithm, which may be selectively implemented by the processor. In one example, when the second unit is operating in the sleeping mode, the processor implements the tinnitus suppression algorithm to help mask ringing or other perceived sounds when no external sound is present, as associated with tinnitus. When the second unit is operating in the awake mode, the processor may deactivate or otherwise adjust the tinnitus suppression algorithm.

The present disclosure contemplates that combinations of one or more of these operational variables and other signal processing strategies that affect power consumption characteristics can be used in different operating modes. At block 204, the processor 62 is configured to process data related to the power consumption characteristics associated with one or more operating modes and data related to the determined charge level to estimate the remaining power supply life associated with the respective one or more operating modes.

At block 206, the processor is configured to generate data or other information that can be used to provide an indication or notification of the remaining power supply life associated with the respective one or more operating modes. Illustratively, the indication is a visual indication or an audible indication. In one example, these indications related to the remaining power supply life are generated on a continuous or periodic basis.

FIG. 4 illustrates a method 210 that is similar to the method 200 of FIG. 3, but includes an additional or alternative block 212, at which the processor is also configured to determine that the remaining power supply life is below a threshold. In response to determining that the power supply life is below the threshold (e.g., less than 30 minutes of power remaining), the processor is configured to generate information that can be used to provide the indication of block 206 and/or a separate notification (audible and/or visible) that the power supply is nearly depleted and should be recharged.

FIG. 5 illustrates another method 220 that is similar to the methods 200, 210 of FIGS. 3 and 4, respectively, but includes an additional or alternative block 222. At block 222, the processor monitors operating conditions of the system. Such operating conditions include, for instance, an orientation or changes in orientation of the one or more components of the system, user interactions between the internal unit, the external unit, and other computing devices, determining that the recipient's voice is present in sound detected by the system, and a current mode and historical information regarding operation in one or more modes. At block 222, in response to the monitored operating conditions, the processor is configured to transition or switch between different operating modes. In one example, the hearing prosthesis is configured to monitor operating conditions and to responsively transition between an awake mode and a sleeping mode. Generally, when a combination of one or more particular operating conditions is met, the hearing prosthesis may automatically transition between modes without requiring input from a user. Although, in other examples, the hearing prosthesis may notify the recipient of the transition between operating modes and/or may require confirmation from the user before transitioning between operating modes.

In one example, the processor monitors the orientation of or changes in orientation of one or more of the first or second units, which corresponds to an orientation of the recipient's body. For instance, if an orientation sensor generates data that is indicative of the recipient being horizontal for longer than a threshold period (e.g., thirty minutes), the processor may determine that the recipient is sleeping, and the processor may responsively switch to the sleeping mode (or continue operation in the sleeping mode).

In another example, the processor monitors user interactions of the internal unit, the external unit, and other computing devices. If, for example, the processor identifies a user input received by one or more of the internal unit, the external unit, or another computing device communicatively coupled to the internal or external units, the processor may determine that the recipient is awake. The processor may then responsively switch to an awake mode (or continue operation in the awake mode).

Alternatively or in combination, the processor may be configured to detect that the internal unit is communicatively coupled with the external unit or another computing device. If, for example, the processor identifies that the internal unit is communicatively coupled to the external unit or another computing device, the processor may determine that the recipient is awake, and responsively switch to an awake mode (or continue operation in the awake mode). Further, the processor may also be configured to determine characteristics of the communicative coupled external unit or computing device. Illustratively, the processor may be configured to determine that the internal unit is communicatively coupled with different types of external units. For example, a first type of external unit may be used when recipient is awake, and a second type of external unit may be used when the recipient is asleep (e.g., a soft external unit that is designed for use while the recipient is asleep).

In another example, the processor monitors the received sounds and determines if the recipient's own voice is present in the received sounds. In this example, the processor is configured to identify particular frequency, amplitude, and/or other characteristics that correspond to the recipient's own voice. If the processor identifies the recipient's voice in the received sounds, the processor may determine that the recipient is awake. The processor may then responsively switch to an awake mode (or continue operation in the awake mode).

In a further example, the processor monitors historical information regarding operation in one or more modes. This historical information includes, for example, the current operating mode, the time in the current operating mode, the time since the last sleeping mode, and the like. If, for example, the system is currently operating in an awake mode, then additional (or a greater degree of) identified conditions may be needed to trigger a transition to the sleeping mode (e.g., the user's voice has not been detected for one hour and the orientation of the internal units indicates that the recipient has been laying down for thirty minutes). In another example, if the processor determines that the internal unit has been operating in the awake mode for the last fourteen hours, then a sleep cycle of the recipient is more likely to occur soon, which in turn can cause the processor to transition to the sleeping mode based on fewer (or a lesser degree of) identified conditions (e.g., the user's voice has not been detected for twenty minutes and the orientation of the internal units indicates that the recipient has been laying down for fifteen minutes). In a further example, if the processor determines that the internal unit has recently transitioned from a sleeping mode to an awake mode (such as less than one hour ago), then the processor may require additional (or a greater degree of) identified conditions to transition to the sleeping mode (e.g., the user's voice has not been detected for one hour, the orientation of the internal units indicates that the recipient has been laying down for thirty minutes, and no other user input has been received in the last thirty minutes).

The present disclosure contemplates other examples of monitored operating conditions and other combinations of one or more operating conditions to trigger a transition from one operating mode to another. The present disclosure also contemplates monitoring operating conditions associated with other modes besides the described awake mode and the sleeping mode. Generally, the one or more operating modes may include a mode that utilizes an external sound processor (such as in the external unit 22), a mode that utilizes only the internal sound processor (e.g., a totally implantable hearing prosthesis mode utilizing only the internal unit 24), and/or other modes that utilize the external sound processor in different configurations.

One example operating mode includes an activity mode (such as a swimming mode), which is characterized by its own set of operating variables that affect a respective power consumption characteristic. In this example, the processor may monitor operating conditions of the system, and responsively transition to the activity mode. For instance, the processor may transition to the activity mode when the external unit is decoupled from the internal unit, or when the processor detects that the external unit is disposed within a waterproof housing and communicatively coupled to the internal unit (e.g., in the case of a swimming mode).

In the method 220, blocks 202 and 204 are similar to the blocks described in relation to method 200. More particularly, at block 202 the processor monitors a charge level of the power supply or battery, and at block 204 the processor estimates the remaining power supply life.

Block 224 of the method 220 is similar to block 212 of the method 210. At the block 224, the processor is also configured to use the monitored operating conditions from block 222 to generate information that can be used to provide the indication of block 206 and/or a separate notification (audible and/or visible) that the power supply is nearly depleted and should be recharged. For example, at block 224, the processor is configured to determine if the remaining power supply life is sufficient to operate the system through the next anticipated sleep period. This determination is based on how long the recipient has been awake, a typical awake/sleep cycle of the recipient, and the estimated power supply life, for example.

As needed, at block 224, the processor is configured to generate the notification information to alert the recipient to the need for recharging the power supply. As the remaining power supply life becomes depleted further, the notification may become more severe (e.g., louder, more visible, more frequent, and the like). If, for instance, the recipient has been awake for a long time (such as longer than sixteen hours), less time is available to charge the battery before the next anticipated sleep period, during which charging the power supply may not be a convenient option. This would be an example of when the processor would generate begin to increase the severity of the notification.

At block 224, if the power supply life becomes depleted below a predetermined threshold, the processor is configured to, based on user preference, switch the operating mode to conserve the power supply life. Various options are contemplated to switch the operating mode to conserve the power supply life. For instance, the processor may switch to the sleeping mode (which is typically a lower power consumption mode as compared to the awake mode). The processor may also adjust one or more operating parameters to transition to the sleeping mode instead of transitioning directly to the sleeping mode (or other lower power mode). For example, the processor may transition to a lower power mode by reducing the number of channels that are being stimulated, lowering the individual channel stimulation rates, and/or lowering the operating voltage of the current sources driving the electrodes. Other techniques for reducing power consumption while maintaining adequate levels of hearing are also possible.

Figure 6A:
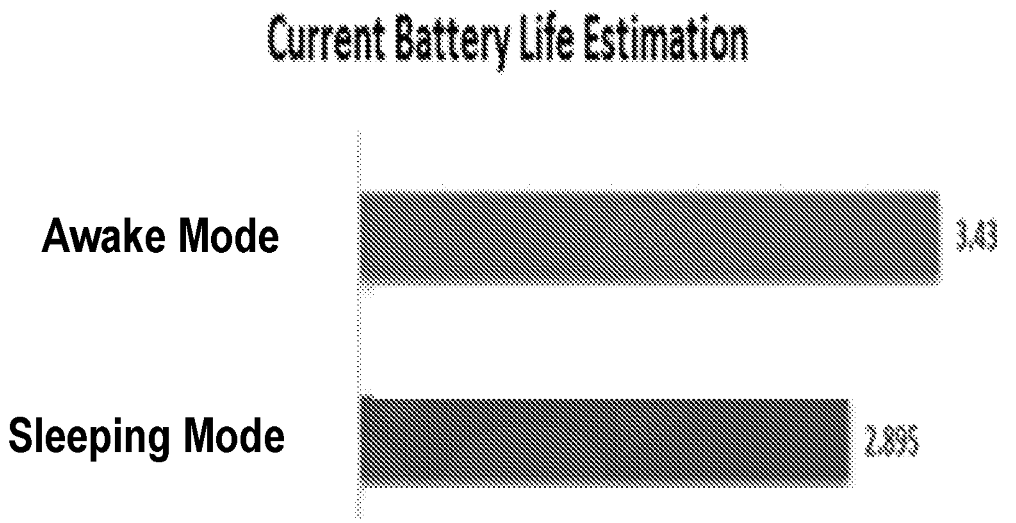
FIGS. 6A-6B illustrate example notifications according to embodiments of the present disclosure.
Figure 6B:
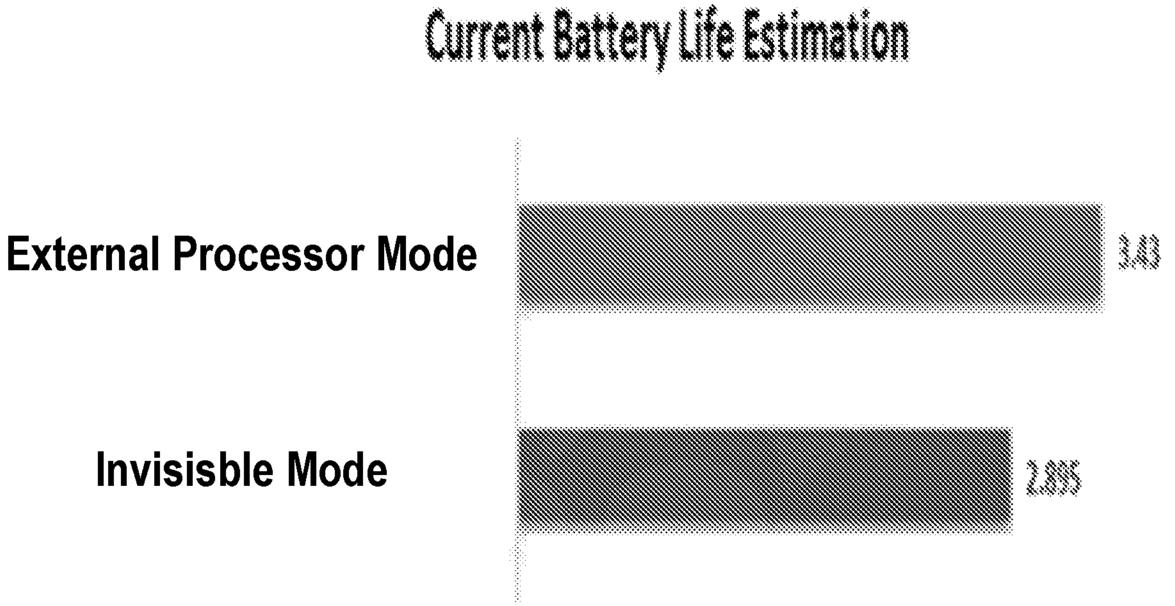

FIGS. 6A and 6B illustrate example visual notification that can be displayed, for instance, by the computing device 100. The visual notifications illustrates a remaining power supply life associated with different operating modes or programs, e.g., an awake mode, a sleeping mode, a mode that utilizes an external sound processor (such as in the external unit 22), and a mode that utilizes only the internal sound processor (e.g., a totally implantable hearing prosthesis mode utilizing only the internal unit 24). In FIG. 6A, for instance, the remaining power supply life associated with the sleeping mode is shorter than the remaining power supply life associated with the awake mode. In this example, this shorter power supply life in the sleeping mode may be caused by the use of signal processing strategies that are not used in the awake mode (e.g., the tinnitus suppression algorithm). In other examples, however, the remaining power supply life associated with the sleeping mode may generally be longer than the remaining power supply life associated with the awake mode.

Figure 7:
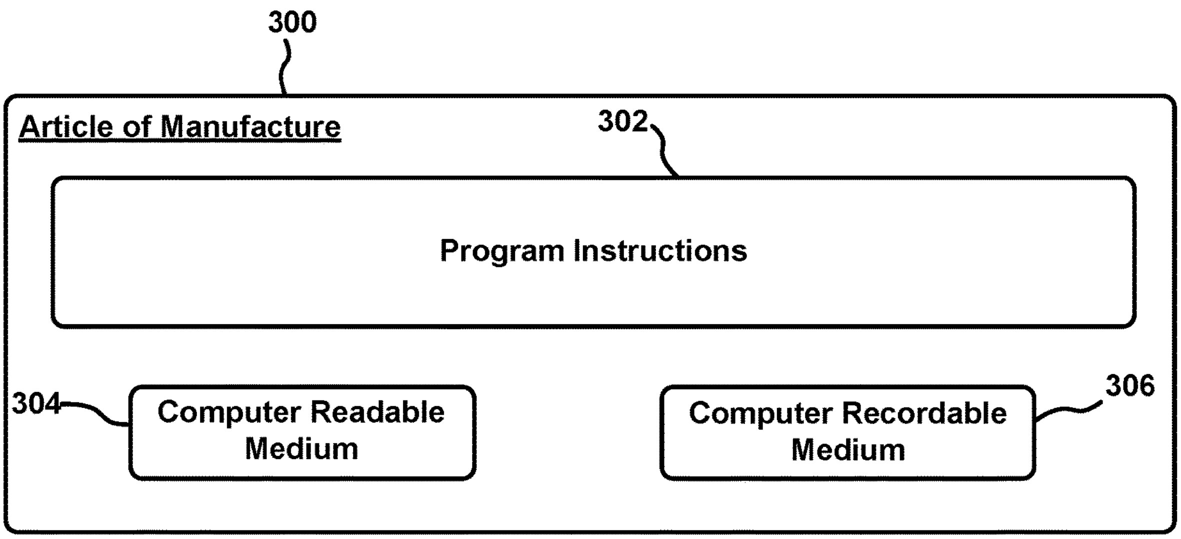
FIG. 7 is a block diagram of an article of manufacture including computer-readable media with instructions for controlling a system according to an embodiment of the present disclosure.

FIG. 7 shows an example of an article of manufacture 300 including computer readable media with instructions 302 for program shifting of a device. In FIG. 7, the example article of manufacture 300 includes computer program instructions 302 for executing a computer process on a computing device that is arranged according to at least some embodiments described herein, such as the methods of FIG. 3-5.

In some examples, the article of manufacture 300 includes a computer-readable medium 304, such as, but not limited to, a hard disk drive, a Compact Disc (CD), a Digital Video Disk (DVD), a digital tape, flash memory, etc. In some implementations, the article of manufacture 300 includes a computer recordable medium 306, such as, but not limited to, a hard disk drive, a Compact Disc (CD), a Digital Video Disk (DVD), a digital tape, flash memory, etc. The one or more programming instructions 302 include, for example, computer executable and/or logic implemented instructions. In some embodiments, a computing device such as the processor(s) 30, 62 and/or the computing device 100, alone or in combination with one or more additional processors or computing devices, may be configured to perform certain operations, functions, or actions to implement the features and functionality of the disclosed systems and methods based at least in part on the programming instructions 302.

The following clauses are provided as further descriptions of example embodiments.

Clause 1—A method comprising: operating, by an electronic processor, a medical device according to a first mode; determining, by the electronic processor, a charge level of a power supply configured to provide power to the medical device; estimating, by the electronic processor and based on the charge level of the power supply, a power supply life for operating the medical device according to a second mode, wherein operating the medical device according to the second mode has a different power consumption characteristic from operating the medical device according to the first mode; determining, by the electronic processor, that the power supply life is less than a threshold; and responsive to determining that the power supply life is less than the threshold, generating, by the electronic processor, information for providing at least one of a visual indication or an audible indication that the power supply life is less than the threshold.

Clause 2—A hearing prosthesis comprising: a transducer configured to receive sound signals; stimulation electronics configured to apply stimulation signals to recipient of the hearing prosthesis; a power supply; and a processor. The processor is configured to: determine a charge level of the power supply; estimate, based on the charge level of the power supply, a first power supply life for operating the hearing prosthesis according to a first mode; estimate, based on the charge level of the power supply, a second power supply life for operating the hearing prosthesis according to a second mode, wherein operating the hearing prosthesis according to the first mode has a different power consumption characteristic from operating the hearing prosthesis according to the second mode; and generate a notification indicative of the first power supply life and the second power supply life.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. One or more non-transitory computer readable storage media encoded with instructions that, when executed by a processor of a medical device, cause the processor to:

determine a current charge level of a power supply configured to provide power to the medical device, wherein the medical device is configured to operate in at least one of first and second modes to deliver stimulation to a recipient of the medical device, wherein the medical device has different power consumptions in each of the first and second modes;

obtain input associated with operation of the medical device;

while the medical device operates in the first mode, determine, based on the input and the current charge level of the power supply, an estimated remaining operation time period during which the medical device is likely to continue to operate in the first mode before switching to operation in the second mode; and determine, based on the estimated remaining time period during which the medical device is likely to continue to operate in the first mode before switching to operation in the second mode, an estimated power supply life for operating the medical device according to the second mode with a second set of configuration settings at an end of the estimated remaining operation time of the medical device in the first mode.

2. The non-transitory computer readable storage media of claim 1, further comprising instructions, that when executed by the processor, cause the processor to:

initiate generation of a notification indicative of the estimated power supply life for operating the medical device according to the second mode when the estimated remaining power supply life for operating the medical device according to the second mode is at least one of equal to or less than a threshold.

3. The non-transitory computer readable storage media of claim 2, wherein the threshold is set based on the input associated with the medical device.

4. The non-transitory computer readable storage media of claim 2, further comprising instructions, that when executed by the processor, cause the processor to:

determine a time period that the medical device has been operating in the first mode; and initiate the generation of the notification indicative of the estimated power supply life for operating the medical device according to the second mode only when the time period that the medical device has been operating in the first mode is greater than a time threshold.

5. The non-transitory computer readable storage media of claim 1, wherein the input is related to a preferred sleep time of the recipient.

6. The non-transitory computer readable storage media of claim 1, wherein the input provides indications of time since the medical device was in a prior mode, wherein the prior mode is at least one of the first and second modes.

7. The non-transitory computer readable storage media of claim 1, wherein the first mode is an awake mode of the medical device and the second mode is a sleep mode of the medical device.

8. The non-transitory computer readable storage media of claim 1, wherein the input is a user input.

9. The non-transitory computer readable storage media of claim 1, wherein the input is based on historical information related to operation of the medical device.

10. The non-transitory computer readable storage media of claim 1, wherein the medical device has different power consumption characteristics in each of the first and second modes.

11. The non-transitory computer readable storage media of claim 10, wherein:

the power consumption characteristics of the medical device in the first mode are related to a first threshold hearing level, the power consumption characteristics of the medical device in the second mode are related to a second threshold hearing level that is greater than the first threshold hearing level and wherein the first and second threshold levels correspond to the lowest levels of sound signals that cause the medical device to deliver stimulation to the recipient of the medical device in each of the first and second modes, respectively.

12. The non-transitory computer readable storage media of claim 10, wherein:

the power consumption characteristics of the medical device in the first mode are related to a first stimulation level, and the power consumption characteristics of the medical device in the second mode are related to a second stimulation level that is less than the first stimulation level.

13. A medical device configured to operate in at least first and second modes and wherein the medical device has different power consumption characteristics in each of the first and second modes, the medical device comprising:

stimulation electronics configured to apply stimulation signals to a recipient of the medical device;

a power supply; and a processor configured to:

operate the medical device according to the first mode;

determine a current charge level of the power supply;

while the medical device operates in the first mode, determine, an estimated remaining operation time period during which the medical device is likely to continue to operate in the first mode before switching to operation in the second mode; and determine, based on the current charge level of the power supply and on the estimated remaining time period during which the medical device is likely to continue to operate in the first mode before switching to operation in the second mode, an estimated power supply life for operating the medical device according to the second mode;

determine that the estimated power supply life for operating the medical device according to the second mode is less than a threshold; and display the estimated power supply life for operating the medical device according to the second mode.

14. The medical device of claim 13, wherein the stimulation electronics, the power supply, and the processor are hermetically sealed and configured to be implanted in the recipient.

15. The medical device of claim 13, wherein the processor is further configured to communicate information to a separate device, and wherein the separate device is configured to display the estimated power supply life for operating the medical device according to the second mode.

16. The medical device of claim 13, wherein the medical device is configured to the estimated power supply life for operating the medical device according to the second mode.

17. The medical device of claim 13, wherein:

the power consumption characteristics of the medical device in the first mode are related to a first threshold hearing level, the power consumption characteristics of the medical device in the second mode are related to a second threshold hearing level that is greater than the first threshold hearing level and wherein the first and second threshold levels correspond to the lowest levels of sound signals that cause the medical device to deliver stimulation to a recipient of the medical device in each of the first and second modes, respectively.

18. The medical device of claim 13, wherein the power consumption characteristics of the medical device in the first mode are related to a first dynamic range, and the power consumption characteristics of the medical device in the second mode are related to a second dynamic range that is less than the first dynamic range.

19. The medical device of claim 13, wherein:

the power consumption characteristics of the medical device in the first mode are related to a first stimulation level, and the power consumption characteristics of the medical device in the second mode are related to a second stimulation level that is less than the first stimulation level.

20. The medical device of claim 13, wherein the first mode is an awake mode of the medical device and the second mode is a sleep mode of the medical device.

* * * * *